(12) United States Patent
Shiotani et al.

(10) Patent No.: US 6,694,805 B2
(45) Date of Patent: Feb. 24, 2004

(54) CANTILEVER FOR SCANNING PROBE MICROSCOPY

(75) Inventors: Koichi Shiotani, Nagano-ken (JP); Masashi Kitazawa, Ina (JP); Kenji Sato, Shiojiri (JP); Akitoshi Toda, Kunitachi (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/122,205

(22) Filed: Apr. 16, 2002

(65) Prior Publication Data

US 2002/0152804 A1 Oct. 24, 2002

(30) Foreign Application Priority Data

Apr. 18, 2001 (JP) ........................ 2001-119174

(51) Int. Cl.[7] .............................. G01B 5/28; G01B 7/34
(52) U.S. Cl. ........................................ 73/105; 250/306
(58) Field of Search ............................ 73/105; 250/306

(56) References Cited

U.S. PATENT DOCUMENTS

| 5,021,364 A | | 6/1991 | Akamine et al. | |
|---|---|---|---|---|
| 5,239,863 A | * | 8/1993 | Kado et al. | 73/105 |
| 5,264,696 A | * | 11/1993 | Toda | 250/306 |
| 5,272,913 A | * | 12/1993 | Toda et al. | 73/105 |
| 5,319,961 A | * | 6/1994 | Matsuyama et al. | 73/105 |
| 5,772,325 A | * | 6/1998 | Hopson et al. | 73/105 |
| 5,883,387 A | * | 3/1999 | Matsuyama et al. | 73/105 |

FOREIGN PATENT DOCUMENTS

JP          1-262403          10/1989

* cited by examiner

*Primary Examiner*—Daniel S. Larkin
(74) *Attorney, Agent, or Firm*—Westerman, Hattori, Daniels & Adrian, LLP (57) ABSTRACT

A cantilever for Scanning Probe Microscopy including: a support portion; a lever portion extended from the support portion; and a probe portion provided at an free end of the lever portion, said probe portion being configured by two triangular thin plates each having one side respectively being one of the different two sides of a V-like notch formed on the free end of the lever, where the thin plates are caused to face each other while having the other side in common. The cantilever for Scanning Probe Microscopy is thereby achieved as having a probe portion which is light in weight and high in rigidity and is readily positioned in alignment and by which measurement at high resolution is steadily possible

23 Claims, 9 Drawing Sheets

CANTILEVER FOR SCANNING PROBE MICROSCOPY

This application claims benefit of Japanese Application No. 2001-119174 filed in Japan on Apr. 18, 2001, the contents of which are incorporated this reference.

BACKGROUND OF THE INVENTION

The present invention relates to a cantilever for use in Scanning Probe Microscopes (SPM), such as Atomic Force Microscopy (AFM).

Scanning Probe Microscopes (SPM) are the apparatus having a resolution of atomic order in measurement and are widely used for example to measure sample surface irregularities. In SPM, a physical quantity, such as tunnel currents or interatomic force, occurring between a probe and a sample is detected and measured. While retaining the probe and the sample at a predetermined distance from each other so as to make constant such measured quantities, the two are scanned relative to each other in the XY direction to measure a fine surface configuration of the sample. A cantilever having the probe at its terminal end is used in such measurement.

Figure 1A:
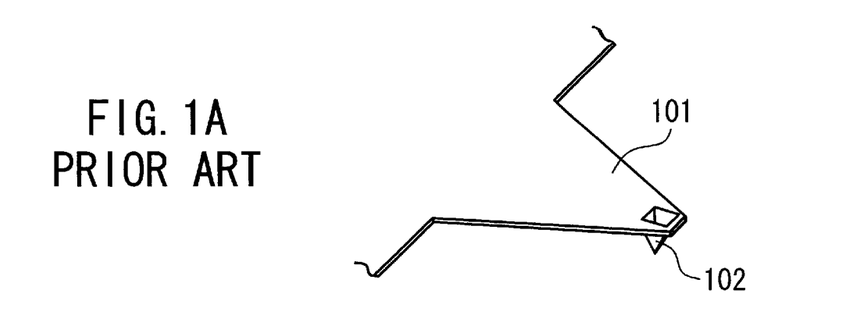
FIGS. 1A to 1D are each a perspective view showing a main portion of an exemplary construction of conventional cantilever.
Figure 1B:
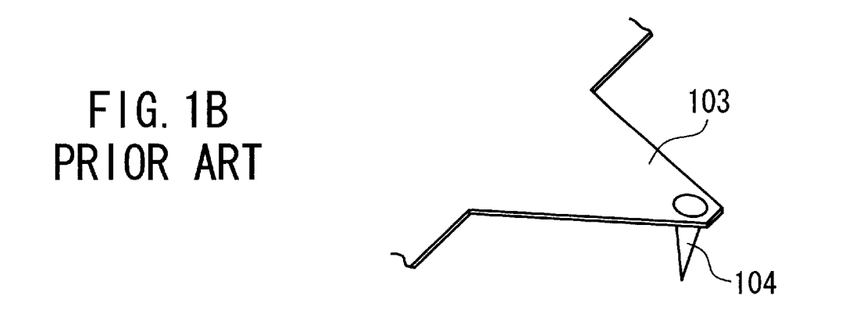
Figure 1C:
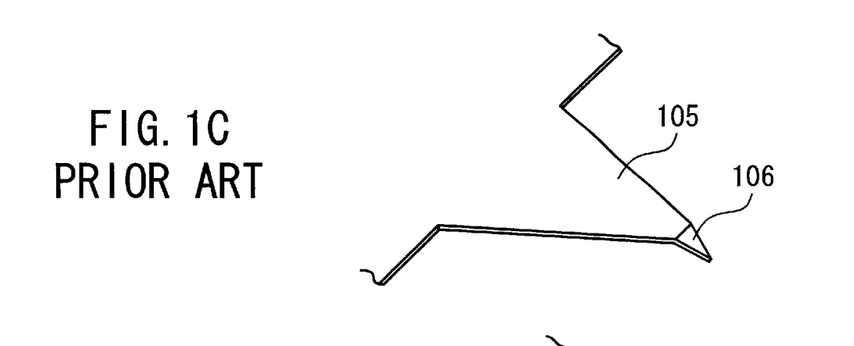

Cantilevers for such application are disclosed in Japanese patent laid-open application Hei-1-262403. FIGS. 1A to 1C are each a perspective view showing a certain part of the cantilever disclosed in the publication. Referring to FIGS. 1A to 1C, numerals 101, 103, and 105 denote a lever portion and numerals 102, 104, and 106 denote a probe portion. The cantilevers shown in FIGS. 1A and 1B have the probe portion 102 in the shape of a quadrangular pyramid or the probe portion 104 in the shape of a circular cone in the vicinity of the free end of the lever portions 101 and 103, respectively. In these cantilevers, neither of the probes 102, 104 is formed on the free end of the lever portions 101, 103. Both are formed in the vicinity of the free end. The cantilever shown in FIG. 1C, on the other hand, has the plane-like probe portion 106 at the free end of the lever portion 105.

Further, the above publication discloses an embodiment where a silicon oxide film or silicon nitride film is used as the material for the lever and probe portions. In the technique disclosed as a fabricating method of the cantilever having the quadrangular pyramid-shaped probe portion 102, gas shown in FIG. 1A, a pit is formed on a silicon substrate; a silicon oxide film or silicon nitride film to become the lever and probe portions is formed on the silicon substrate and in the pit thereof; a support portion consisting of glass is then bonded to the rear of the fixing end of the lever portion, and the silicon substrate is etched away. This method is the so-called microcast method.

Figure 1D:
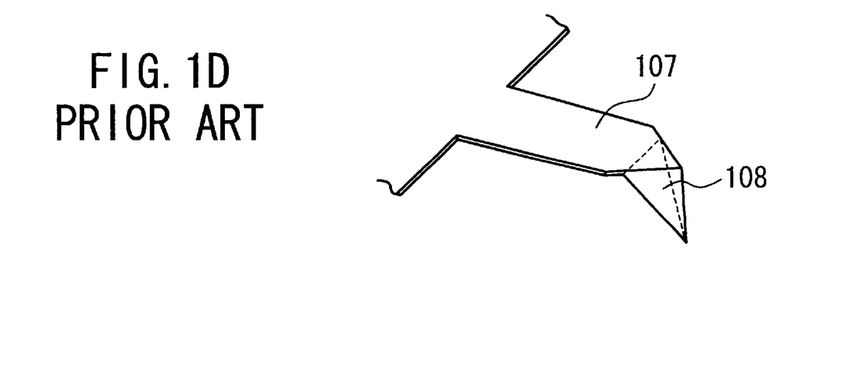

Further, a cantilever disclosed in U.S. Pat. No. 5,021,364 is shown in FIG. 1D as a typical example of a cantilever having a probe portion formed by an etching process of silicon. While, as shown in FIG. 1D, a probe portion 108 is formed on the free end of a lever portion 107, the probe portion 108 is not of a film. It is provided as a bulk-like probe portion formed of a piece of silicon block.

The above described conventional cantilevers, however, have the following problems: First, of the cantilevers such as those shown in FIGS. 1A and 1B where the probe portion 102, 104 is not formed on the terminal end of the free end of the lever portion 101, 103, the probe portion is covered by the lever portion. The probe portion is thus hidden and cannot be seen from the upper side of the cantilever. Accordingly, when these cantilevers are used in SPM, the terminal end of the probe and the measurement point of the object to be measured cannot be simultaneously observed from an optical microscope for use in aligning the sample and the probe portion. Positioning alignment at the micrometer level of the point to be measured thus becomes difficult when the cantilever is set to the SPM apparatus.

Further, since the probe position is not ascertainable, it is not always possible to start the measurement from a desired region on the sample. Since it is manipulated so as to shift the measurement position by a small extent each time, it takes time before the measurement of such a desired region can be made. As a result, a longer time is necessary until the completion of the measurement. Also in some cases, the resolution may be degraded during the scanning for alignment due to the adhering of dust or the like or to the thickening of the probe portion by abrasion with the sample.

In this regard, the probe portion of those cantilevers as shown in FIGS. 1C and 1D is located at the terminal end of free end of the lever portion; and the probe portion can be easily brought near to a region to be observed on the sample. In short, it is easy to use. Both of these constructions, however have problems to be mitigated. In particular, since acuteness of the terminal end of the probe of the cantilevers shown in FIG. 1C cannot go beyond the resolution of photolithography, it is difficult to achieve a sharp terminal end of the probe which is important in SPM measurement at high resolution. Specifically, it is not easy to achieve a radius of curvature of 50 nm or less for the terminal end of the probe. Further, since the probe portion is in the shape of a triangular flat plate, the probe portion lacks rigidity. When a large force is placed between the sample and the probe portion, deformation occurs not only in the lever portion, but also at the triangular flat plate of the probe portion whereby measurement becomes unstable. If such a cantilever is used in the type of SPM measurement method where the cantilever is kept oscillated, a peak due to a separate oscillation mode occurs in a frequency region relatively near the fundamental frequency. The measurement becomes unstable or is degraded in sensitivity.

Further, the probe portion 108 of the cantilever shown in FIG. 1D is a bulk probe portion consisting of silicon. When compared with the other cantilevers shown in FIGS. 1A to 1C, the probe portion becomes heavier for the same probe height. This causes a difficulty in making a cantilever of which the cantilever length is short and the resonance frequency is high. In particular, its terminal end becomes structurally heavier so that the cantilever having a high resonant frequency becomes difficult to be designed.

Further, in SPM measurement, the probe portion of a cantilever is required to have an extremely acute tip to perform high resolution measurement. In this regard, of the probe portion 102 in the shape of a quadrangular pyramid shown in FIG. 1A, the tip is difficult to be terminated at a point theoretically because of its structure. It has a problem concerning acuteness of the probe portion. This is because the quadrangular pyramid has four ridgelines extending toward the terminal end of the probe and the four line segments do not theoretically cross each other at a point. Further, for the probe portion in the shape of a circular cone shown in FIG. 1B, it is also rather difficult to make the probe portion terminating at a point for a similar reason as the above, if a cone-shaped probe is regarded as resulting from the transition of a quadrangular pyramidal probe to a polygonal pyramidal probe Furthermore, while SPM was used originally for the observation of a crystal sample surface or a deposited film surface, there has been an increasing need for SPM in recent years to measure the surface configuration of a sample (such as semiconductor IC device) having a larger irregularity for example of 100 nm to several μm. There is a demand thus for further slenderness not only of the probe tip but also of the thickness of the probe portion away from the probe tip toward the lever side. In short, a probe portion having a high aspect ratio is demanded. This, however, is difficult to be achieved by the conventional cantilevers.

SUMMARY OF THE INVENTION

To eliminate the above problems, it is an object of the present invention to provide a cantilever for Scanning Probe Microscopy by which it is easy, before SPM measurement (scanning), to position the probe portion in alignment with the region to be observed on a sample and a SPM measurement at high resolution is possible, and which is suitable for high-speed scan measurement.

It is a further object of the invention to provide a cantilever for Scanning Probe Microscopy in which, as a result that it is made easier to position the probe portion in alignment with the region to be observed on a sample before SPM measurement (scanning), changes in the shape of probe portion due to wear of the probe portion or to adhering of foreign matter thereto are mitigated so that measurement at high resolution is possible in a stable manner for a longer time period.

It is another object of the invention to provide a cantilever for Scanning Probe Microscopy, having a probe portion of a high aspect ratio while structurally capable of achieving a steadily acute probe chip configuration.

It is another object of the invention to provide a cantilever for Scanning Probe Microscopy in which the rigidity of the probe portion is high and which operates steadily.

It is another object of the invention to provide a cantilever for Scanning Probe Microscopy, having a probe structure applicable to the range of low resonance frequencies to high resonance frequencies.

It is another object of the invention to provide a cantilever for Scanning Probe Microscopy, having a relatively short length which makes high-speed scanning measurement possible for those having a high resonance frequency.

These and other objects are described correspondingly to the respective aspects of the invention as follows. In particular, it is an object of a first aspect of the invention to provide a cantilever for Scanning Probe Microscopy in which the positioning alignment of the probe portion is easy and a drop in resonant frequency is less so that a high-resolution measurement is steadily made possible.

In accordance with the first aspect of the invention, there is provided a cantilever for Scanning Probe Microscopy, including: a support portion; a lever portion extended from the support portion; and a probe portion provided at a free end of the lever portion, wherein the probe portion is configured by two thin plates crossing each other in a manner facing each other, each having one side respectively being one of the different sides of V-like notch formed on the free end of the lever portion. By such construction, it is possible to achieve a cantilever for Scanning Probe Microscopy in which the probe portion is obtained as light in weight and high in rigidity so that the positioning alignment of the probe portion is easy and a drop in resonant frequency is less to make a high-resolution measurement steadily possible. The above object is thereby accomplished.

It is an object of a second aspect of the invention to provide a probe portion having a high aspect ratio in the cantilever for Scanning Probe Microscopy according to the first aspect.

In accordance with the second aspect of the invention, the two thin plates of the probe portion in the cantilever for Scanning Probe Microscopy according to the first aspect are respectively warped and curved toward the sides at which they face each other.

By such construction, the probe portion can be achieved as light in weight and high in rigidity and at the same time having a high aspect ratio where its tip has a steady acuteness. The above object is thereby accomplished.

It is an object of a third aspect of the invention to provide a probe portion which has a high aspect ratio and by which positioning alignment is even more easier in the cantilever for Scanning Probe Microscopy according to the first or second aspect.

In accordance with the third aspect of the invention, the apex of the probe portion is disposed at a position perpendicularly below the free end of the lever portion or at a position beyond the free end of the lever portion in the cantilever for Scanning Probe Microscopy according to the first or second aspect.

By such construction, the probe portion can be achieved as light in weight and high in rigidity and at the same time having a high aspect ratio with its tip having a steady acuteness and capable of more easily being positioned in alignment. The above object is thereby accomplished.

The objects of fourth to sixth aspects of the invention are to provide actual configuration of thin plates for forming the probe portion in the cantilever for Scanning Probe Microscopy according to the first to third aspects.

In accordance with the fourth aspect of the invention, the two thin plates constituting the probe portion are each triangular in the cantilever for Scanning Probe Microscopy according to any one of the first to third aspects. In accordance with the fifth aspect of the invention, the two thin plates constituting the probe portion are each quadrangular in the cantilever for Scanning Probe Microscopy according to any one of the first to third aspects. In accordance with the sixth aspect of the invention, the two thin plates constituting the probe portion are each sector-shaped in the cantilever for Scanning Probe Microscopy according to any one of the first to third aspects.

By such construction, the cantilever for Scanning Probe Microscopy can be achieved as reduced in weight with securing the rigidity at the probe portion and capable of preventing a drop in the resonance frequency. The above object is thereby accomplished.

It is an object of a seventh aspect of the invention to provide a construction of the cantilever for Scanning Probe Microscopy according to the first to sixth aspects of which the fabricating method is relatively easy.

In accordance with the seventh aspect of the invention, the probe portion and the lever portion in the cantilever for Scanning Probe Microscopy according to any one of the first to sixth aspects are monolithically formed from the same material.

By such construction, it is possible to achieve a cantilever for Scanning Probe Microscopy which can be made through a relatively easy fabricating process. The above object is thereby accomplished.

It is an object of an eighth aspect of the invention to provide an electrical conductive construction of the cantilever for Scanning Probe Microscopy according to the seventh aspect.

In accordance with the eighth aspect of the invention, the material for monolithically forming the probe portion and the lever portion is a conductive film in the cantilever for Scanning Probe Microscopy according to the seventh aspect.

By such construction, it is possible to achieve the cantilever for Scanning Probe Microscopy which has an electrically conductive lever portion and a probe portion. The above object is thereby accomplished.

It is an object of a ninth aspect of the invention to provide a construction of the cantilever for Scanning Probe Microscopy according to the first to sixth aspects of which room for designing is greater.

In accordance with the ninth aspect of the invention, the probe portion and the lever portion in the cantilever for Scanning Probe Microscopy according to any one of the first to sixth aspects are formed of different material from each other.

By such construction, it is readily possible to make wider the scope of design concerning the rigidity of the probe portion, and spring constant and resonance frequency, etc. of the lever portion. The above object is thereby accomplished.

It is an object of a tenth aspect of the invention to provide a construction capable of readily changing the characteristics of the probe portion and the lever portion in the cantilever for Scanning Probe Microscopy according to the first to ninth aspects.

In accordance with the tenth aspect of the invention, a film of a material different from the constituting material of the probe portion and the lever portion is formed on a surface of the probe portion and the lever portion in the cantilever for Scanning Probe Microscopy according to any one of the first to ninth aspects.

By such construction, it becomes possible to adjust hardness of the probe portion or to add conductivity to the lever portion and the probe portion without changing such characteristics of the lever portion as resonance frequency and spring constant, thereby achieving the cantilever of a higher added value. The above object is thereby accomplished.

DESCRIPTION OF THE PREFERRED EMBODIMENTS

Figure 2:
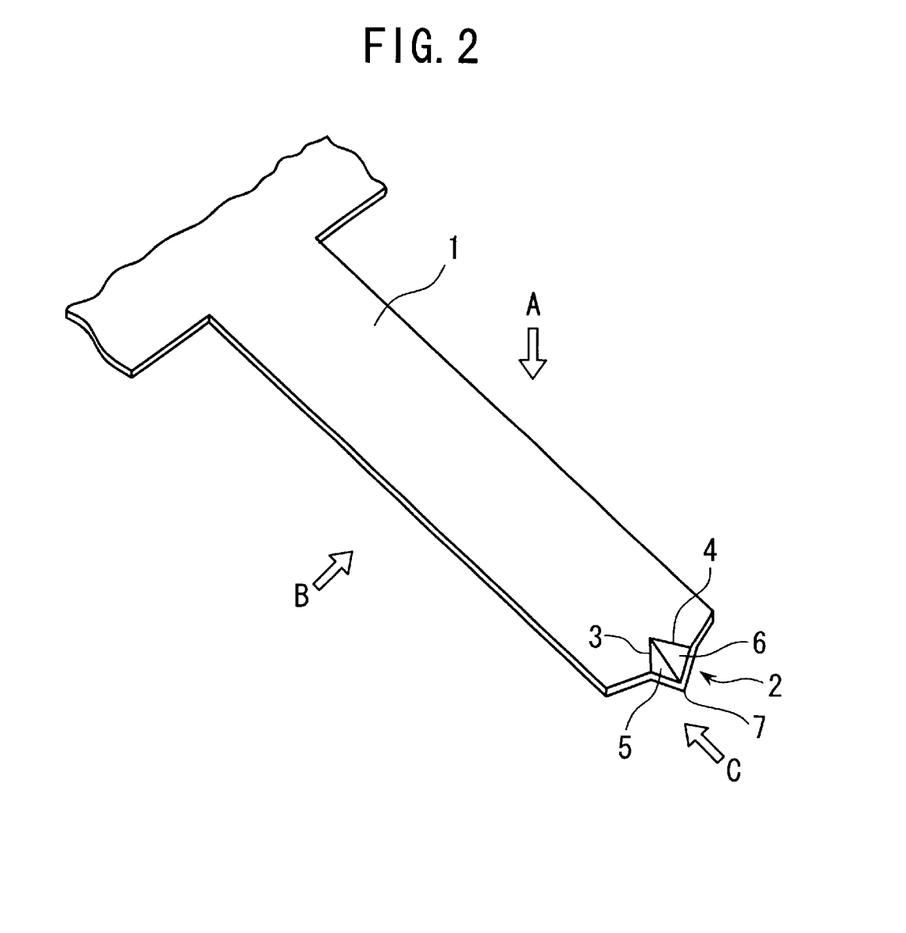
FIG. 2 is a perspective view showing the whole structure except a support portion of a first embodiment of the cantilever for Scanning Probe Microscopy according to the invention.
Figure 3A:
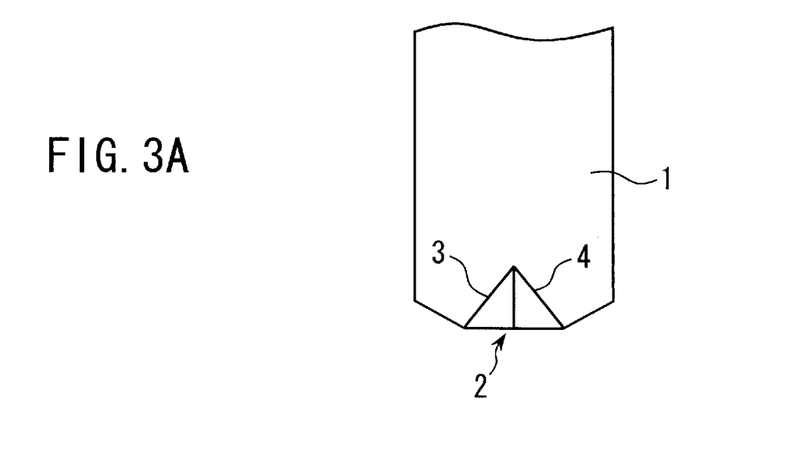
FIGS. 3A, 3B, and 3C are a top view, a side view and a front view, respectively, of a main portion of the first embodiment shown in FIG. 2.
Figure 3B:
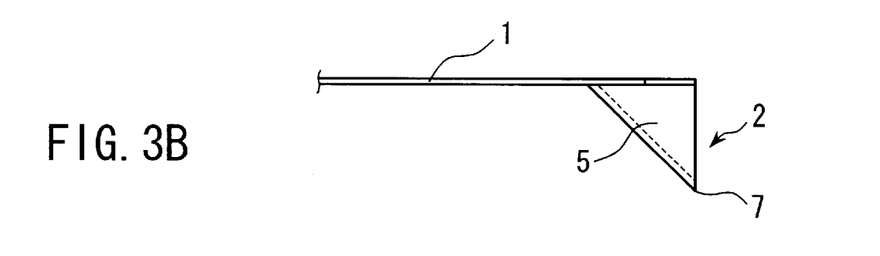
Figure 3C:
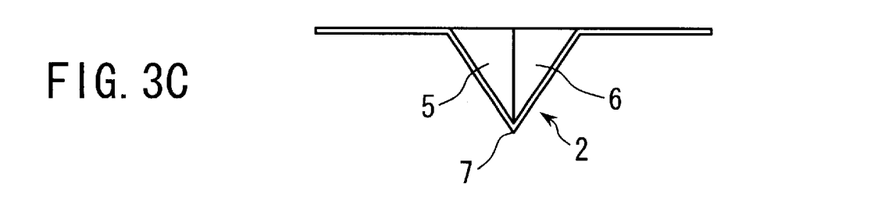
Figure 4:
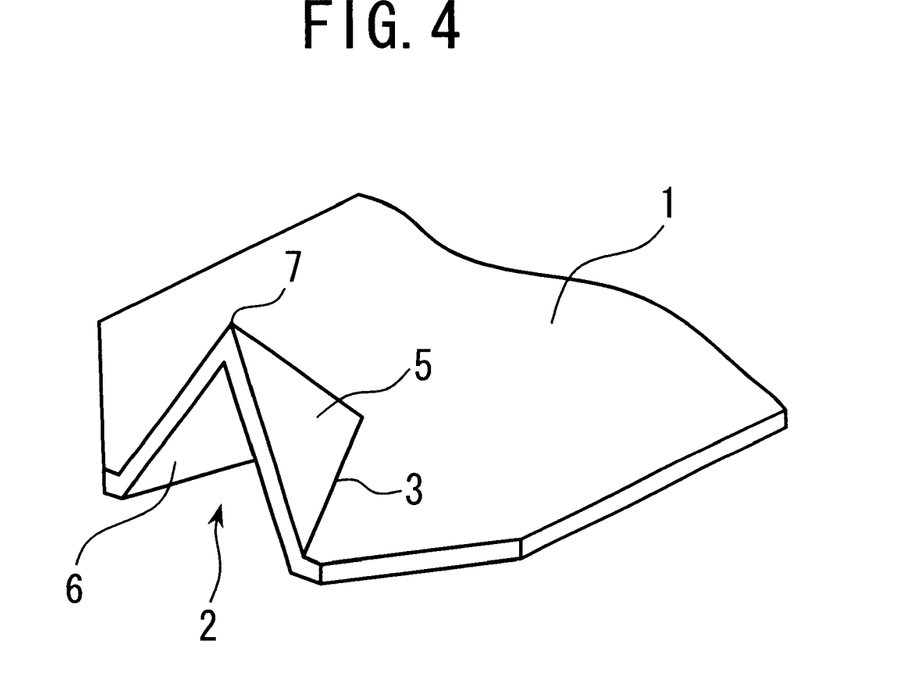
FIG. 4 is an enlarged perspective view of the probe portion of the cantilever according to the first embodiment shown in FIG. 2.

Some embodiments of the invention will now be described. A description will be first given below with respect to a first embodiment of the invention. Shown in FIG. 2 is the entire structure of a lever portion and a probe portion of the first embodiment of the cantilever for Scanning Probe Microscopy according to the invention. FIGS. 3A, 3B, and 3C show the structure of the cantilever of FIG. 2 as seen from the directions of arrow A (top view), arrow B (side view), and arrow C (front view), respectively. FIG. 4 shows an enlarged perspective view thereof as seen from the bottom side. Here, a support portion of the cantilever is omitted from the figures.

In the present invention, as shown in this embodiment, a probe portion 2 is formed at the free end side of a lever portion 1. Here the probe portion 2 consists of two triangular thin plates 5 and 6 having as one edge thereof two different edges 3 and 4, respectively, of a V-shaped notch formed at the free end side of the lever portion 1 while sharing the other edge in common. An apex 7 of the probe portion 2 is located perpendicularly below the free end of the lever. In other words, the probe portion 2 configured by removing the bottom surface and one side surface from a triangular pyramid is formed at a terminal end of the lever portion 1.

The two corners of the free end, i.e., terminal end of the lever portion 1 are cut off. This configuration is the result of cutting off the unnecessary portions, since the terminal end portion of the lever, because of the probe portion 2 existing thereat, cannot be used as a portion for reflecting light by which an oscillation of the cantilever is to be detected. The lever portion is thereby reduced in weight around the terminal end and the probe portion actually occupies a smaller spatial volume so that dumping of oscillation due to the medium (air or water) between the sample and the lever portion is also reduced. With the resulting configuration of the terminal end portion of the lever, drop in the resonance frequency is less and responsivity is higher.

The lever portion 1 has, for example, a length of the order of 100 $\mu$m, a width of 30 $\mu$m, a thickness of 1500 Å, and the height of the probe portion 2 is of the order of 7 $\mu$m. Further, the radius of curvature of the terminal end of the probe portion is of the order of 20 nm even for a thin lever portion such as the above. While the lever portion 1 and probe portion 2 are of a silicon nitride film, it is not limited to this. Furthermore, the above-mentioned dimensions of the cantilever are given by way of examples only and are not limited to these.

Figure 5A:
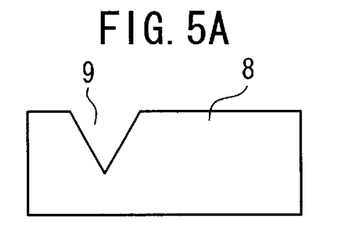
FIGS. 5A to 5G show an example of the fabricating process of the cantilever according to the first embodiment shown in FIG. 2.

An example of the fabricating process of the cantilever shown in the above embodiment will be described below with reference to FIGS. 5A to 5G. It should be noted that FIGS. 5A to 5F are all shown as the configuration in section. First, instead of one having OF (orientation flat) in normal <001> orientation, a silicon wafer of (100) face having OF tilted by 45° from <011> orientation is prepared. A desired mask is then used to perform anisotropic etching by means of an alkaline aqueous solution such as KOH (potassium hydroxide), TMAH (tetramethylammonium hydroxide) or the like on a silicon substrate 8 consisting of the silicon wafer so as to form a plurality of probe forming pits 9 as shown in FIG. 5A over one surface of the silicon substrate 8. The pit 9 results in the form of an inverted pyramid surrounded by four (111) faces of silicon.

Figure 5B:
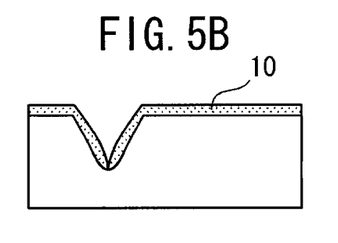

As shown in FIG. 5B, then, a silicon oxide film 10 is formed on the surface of the pit 9 to perform oxidation for achieving an acuteness. At this time, the thermal oxidation temperature is preferably 950° C. or lower. This is because the film thickness of silicon oxide film at the apex of the pit is reduced by performing thermal oxidation treatment at a temperature lower than that of glass transition of the silicon oxide film. As a result, it is possible to achieve an acuteness at the apex of the indentation of the pit 9 over which the silicon oxide film 10 is formed.

Figure 5C:
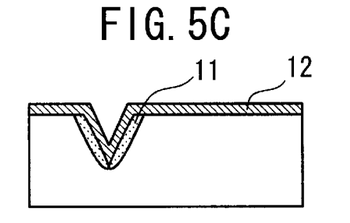

As shown in FIG. 5C, then, the silicon oxide film 10 other than that within the pit 9 is removed and a silicon oxide film 11 is left only within the pit 9. Over the top thereof, a silicon nitride film 1 to become the lever portion and the probe portion is deposited by means of LP-CVD (Low Pressure Chemical Vapor Deposition) or the like.

Figure 5D:
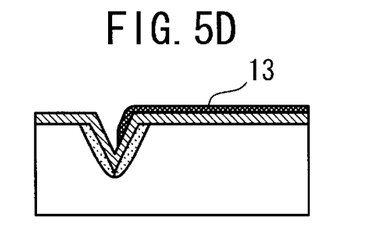

As shown in FIG. 5D, then, a resist 13 is patterned to form the lever portion and the probe portion. Here, the patterning of the resist 13 is performed so that the terminal end of the probe portion is located toward the lever portion side from the center of the pit 9. When seen from the upper side of the wafer, the manner of such patterning of the resist 13 is as shown in FIG. 5G. In particular, the patterning is performed so that the terminal end of the lever portion is disposed at an intermediate portion of a tilted surface of the pit 9. It should be noted that the lever portion forming the resist pattern on the silicon wafer is formed in a plural number corresponding to the number of pits 9 which have been made to form probe portions.

Figure 5E:
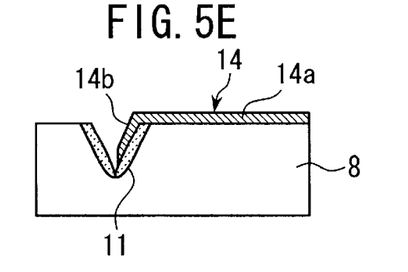

As shown in FIG. 5E, then, dry etching is performed to form a cantilever 14 consisting of a lever portion 14*a* and a probe portion 14*b*. Here, the dry etching is suitably performed by means of RIE (Reactive Ion Etching), but it is not limited to this. For example, ICP-RIE (Inductively Coupled Plasma Reactive Ion Etching) can also be used. By thus forming the probe portion 14*b*, the probe tip is necessarily terminated at a point.

Figure 5F:
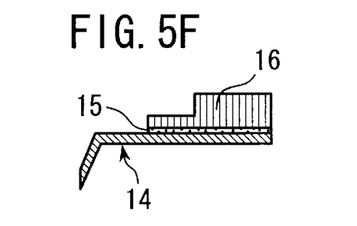
Figure 5G:
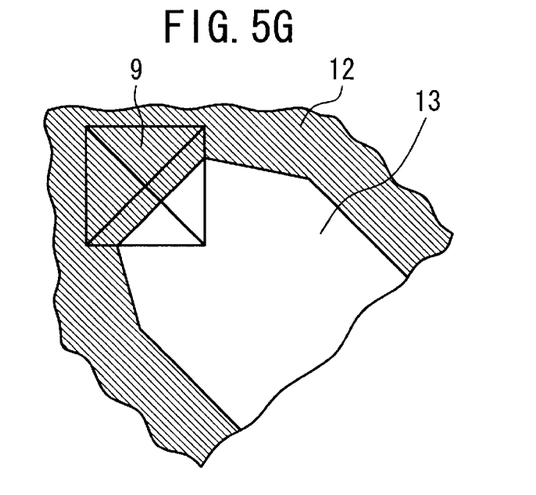

As shown in FIG. 5F, then, a support portion 16 of glass material is bonded to the fixing end side of the lever portion 14*a* by way of a bonding layer 15 and the silicon substrate 8 and the silicon oxide film 11 within the pit are etched away. The cantilever 14 is thereby complete. Here a silicon oxide film is suitably used as the bonding layer 15. Further, while one using glass has been shown as the support portion 16, it is not limited to this. Forming the support portion 16 by silicon or the like is also possible.

The above series of manufacturing process is a cantilever fabricating method by the so-called batch fabrication and is capable of manufacturing cantilevers at lower costs, since a plurality of cantilevers are fabricated at once.

In the cantilever of this embodiment, the probe portion is at the free end of the lever portion. When used as attached to SPM apparatus into which an optical microscope is combined, it becomes easier in performing measurement (scanning) to align the probe portion in a short time with the region to be observed on a sample. It thus becomes possible to make shorter the time necessary for measurement. Further, the structure of the probe tip is formed as a crossing of three ridges which, in theory, can be more readily sharpened.

A steadily sharp probe tip can thus be achieved. Accordingly, by using the cantilever of such configuration, SPM measurement at high resolution becomes possible. Further, since two thin plates lean against each other in the structure of the probe portion, it has a sufficient rigidity as a three-dimensional structure.

In addition, since the probe portion is relatively light in weight, it can be applied to a short cantilever which has a small spring constant and is used for high resonance frequencies. When compared with the case of forming a relatively heavy probe portion at the terminal end of the lever portion, the cantilever can be made as having a higher resonance frequency. For example, the construction of the present embodiment is advantageous in constructing a cantilever for use in high-speed scan SPM measurement or a soft and short cantilever of lower oscillation noise.

It should be noted that, while the present embodiment has been shown as one using an insulating silicon nitride film for the material of the lever portion and the probe portion, it is not limited to such and a film other than that of silicon nitride can also be used. For example, an electrically conductive DLC (Diamond Like Carbon) can also be used. By thus adding conductivity to the lever portion and the probe portion, it can be used also as the cantilever of SCM (Scanning Capacitance Microscopy). Further, charging of static electricity at the lever portion can be prevented so that it is possible to reduce such adverse effects due to electrostatic charge as a warp of lever or an occurrence of oscillation other than proper oscillation. As a result, accuracy in measurement can be improved.

Figure 6A:
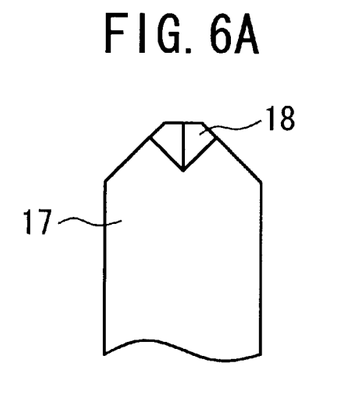
FIGS. 6A and 6B are a top view and a side view showing a modification of the probe portion of the cantilever according to the first embodiment.
Figure 6B:
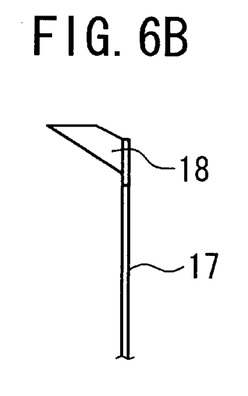
Figure 7A:
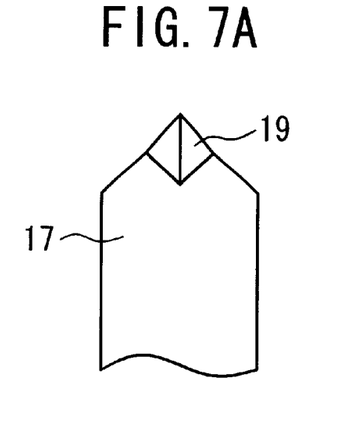
FIGS. 7A and 7B are a top view and a side view showing another modification of the probe portion of the cantilever according to the first embodiment.
Figure 7B:
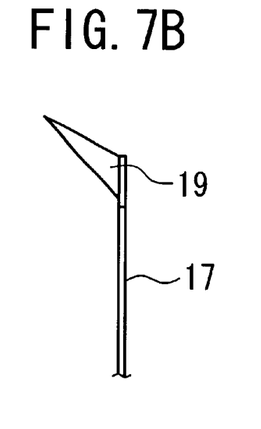
Figure 8A:
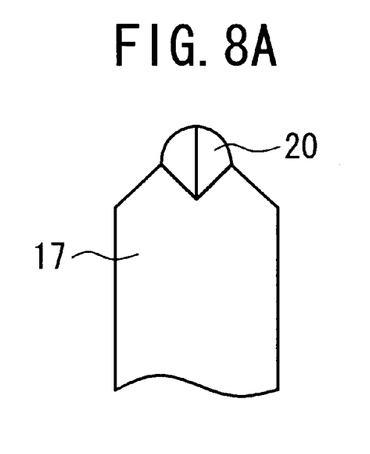
FIGS. 8A and 8B are a top view and a side view showing yet another modification of the probe portion of the cantilever according to the first embodiment.
Figure 8B:
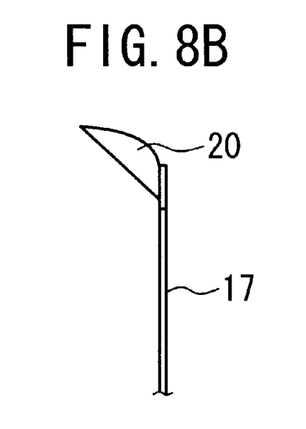

Further, while the present embodiment has been shown as one in which the thin plates of the probe portion are each triangular and the position of the apex of the probe is located perpendicularly below the free end of the lever portion, the configurations such as those shown in FIGS. 6A, 6B to FIGS. 8A to 8B are also possible. In particular, shown in FIGS. 6A, 6B is one using quadrangular thin plates 18 as the thin plates for constituting the probe portion; shown in FIGS. 7A, 7B is one using modified triangular thin plates 19 as the thin plates; and shown in FIGS. 8A, 8B is one using sector thin plates 20 as the thin plates. Further the apex of probe of each probe portion is located beyond the free end of the lever portion 17.

It is thought that the accuracy in positioning alignment is furthermore improved by such construction. Furthermore, the modifications shown in FIGS. 6A, 6B to FIGS. 8A, 8B, can also be configured to have the probe apex located at a position shifted from the free end toward the fixing end of the lever portion 17. By using such configuration, there is an advantage of reducing weight of the probe portion, since the thin plates of the probe portion can be smaller.

Figure 9A:
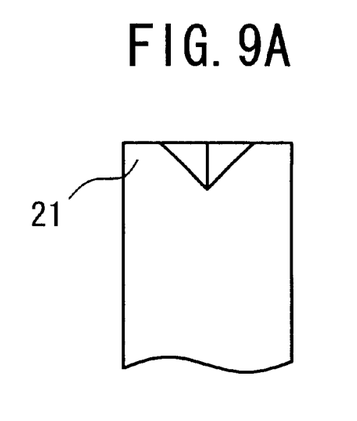
FIGS. 9A and 9B each show a modification of the free end of lever portion of the cantilever according to the first embodiment.
Figure 9B:
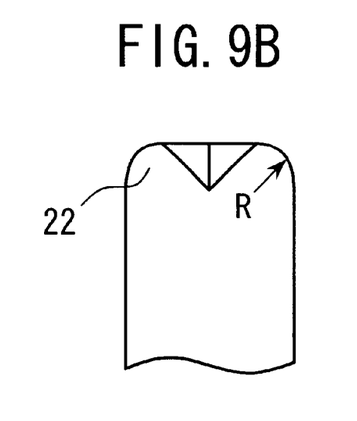

Further, while the present embodiment has been shown as of the configuration where the two corners of the free end of the lever portion are cut off, it is not limited to this. It is naturally also possible that the free end of the lever have rectangular angles 21 with leaving the corner portions as they are as shown in FIG. 9A or that the free end of the lever have rounded corners 22 with providing a curvature R at the corners as shown in FIG. 9B. If the free end of the lever portion is made rectangular as shown in FIG. 9A, the fabricating method becomes easier. On the other hand, if the corners are provided with the curvature R as shown in FIG. 9B, a similar advantage can be achieved as the configuration where the corners are cut off.

Further, a fabricating method related to the present embodiment has been described as a fabricating method where a wafer having OF tilted by 45° from the normal orientation is used, it is also possible to use a wafer having a normal OF and to perform photolithography by tilting photomask 45° at the time of forming the lever portion and the probe portion. Further, if the lever portion is formed by the method of depositing it by LP-CVD or the like, there is also a secondary advantage that a thin film lever portion can be readily formed in a steady manner as compared to the technique where the lever portion is formed by etching of silicon or the like.

Figure 10:
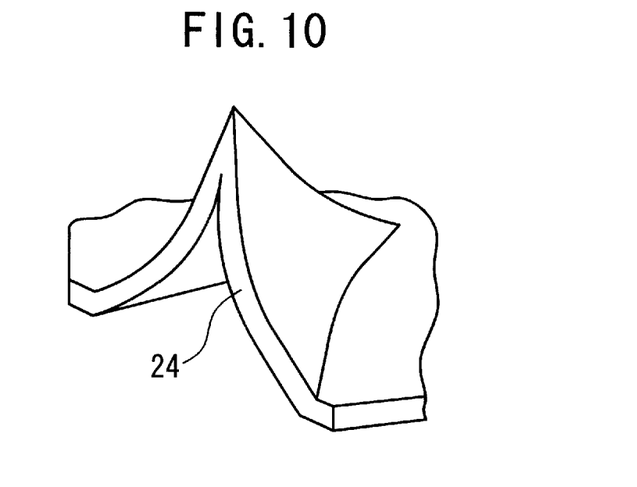
FIG. 10 is a perspective view showing the probe portion of the cantilever according to a second embodiment of the invention.

A second embodiment of the invention will now be described with reference to FIG. 10. As shown in FIG. 10, the cantilever according to this embodiment is configured to have a thin plate 24 of the probe portion which is curved as warped inward as indicated in the figure. The vertical angle of the probe portion is thereby smaller toward the terminal end of the probe so that the aspect ratio at the terminal end of the probe is improved as compared to that in the first embodiment. The construction of other portion is substantially identical to the first embodiment.

The fabricating method of the cantilever according to the second embodiment is substantially identical to the fabricating method related to the first embodiment, and it suffices to perform the sharpening oxidation treatment for a sufficiently long duration in the processing step shown in FIG. 5B. Since the aspect ratio is thus improved according to the second embodiment, it is advantageous in measuring a sample having greater irregularities.

Figure 11A:
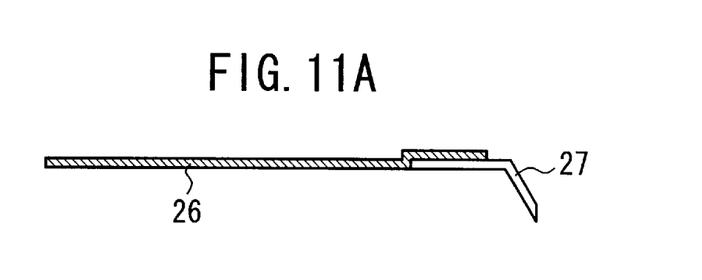
FIGS. 11A, 11B, and 11C each show in section a cantilever according to a third embodiment of the invention and modifications thereof.
Figure 11B:
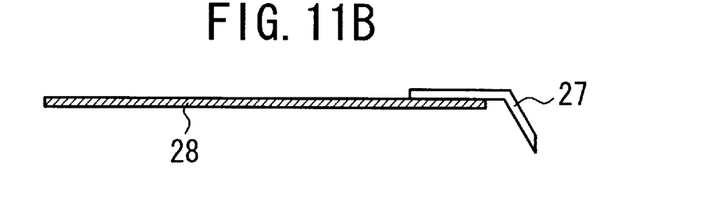
Figure 11C:
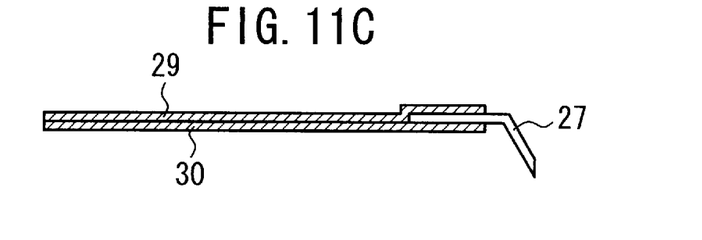

A third embodiment of the invention will now be described with reference to FIGS. 11A, 11B, and 11C. In FIGS. 11A, 11B, and 11C, numerals 26, 28, 29, and 30 each denote a lever portion consisting of silicon carbide film and a numeral 27 denotes a probe portion consisting of silicon nitride film. While each configuration is similar to that described in the first or second embodiment, the lever portion and the probe portion in each case are formed as separate members of different material from each other as described above. In those shown in FIGS. 11A and 11B, the lever portions 26, 28 and the probe portion 27 are bonded to each other at one face only. In such construction, since the probe portion 27 is retained by only one face of the lever portion, the bonding rigidity is not very strong. In the construction shown in FIG. 11C, on the other hand, the probe portion 27 is bonded to the two pieces of the lever portions 29 and 30 in a manner sandwiched between the free end portions thereof. In this case, since the probe portion 27 can be retained at both faces thereof by the lever portion, the bonding rigidity becomes stronger. Here, the lever portion and the probe portion are formed by means of LP-CVD or the like.

By thus forming the lever portion and the probe portion as different members, the scope of design of the cantilever becomes greater. For example, if a material having a relatively high hardness is used for the probe portion and a material having a relatively low hardness is used for the lever portion, wear of the probe portion can be prevented and at the same time the cantilever can be fabricated as soft and having low spring constant. The soft cantilever of low spring constant is capable of measuring a soft sample which is susceptible to damage. In another instance, use of silicon nitrid film in the case of simultaneously performing fluorescence observation and SPM measurement of a sample may result in a lower measurement accuracy due to an emission of the material itself. In such case, it is desirable that only the probe portion is formed of polysilicon while the lever portion is formed of a silicon nitride film or the like.

While the present embodiment has been shown as one using a silicon carbide film for the lever portion and a silicon nitride film for the probe portion, it is not limited to this and polysilicon, silicon carbide film, silicon nitride film, DLC, etc. may be suitably combined, respectively, for the lever portion and the probe portion. Further, while one using members of the same material for the two pieces of lever portions 29, 30 to sandwich the probe portion 27 has been shown concerning the construction shown in FIG. 11C, it is naturally also possible to use members of different material for the upper and lower lever portions. At this time, those having substantially identical thermal expansion coefficients are preferably used as the materials of the lever portions. By using such construction, it becomes possible to reduce a warp at the lever portion. Furthermore, signal-to-noise ratio at the time of measurement is improved and the measurement at a higher accuracy becomes possible by using a material having a higher reflectance as the film for forming the lever portion to be disposed at the side opposite to the terminating direction of the probe portion 27.

Moreover, if films of different thermal expansion coefficient are deliberately used as the two pieces of lever portions 29, 30 in the construction shown in FIG. 11C, it becomes possible to fabricate a warped cantilever which can be applied to measurement for example of a side wall.

Figure 12:
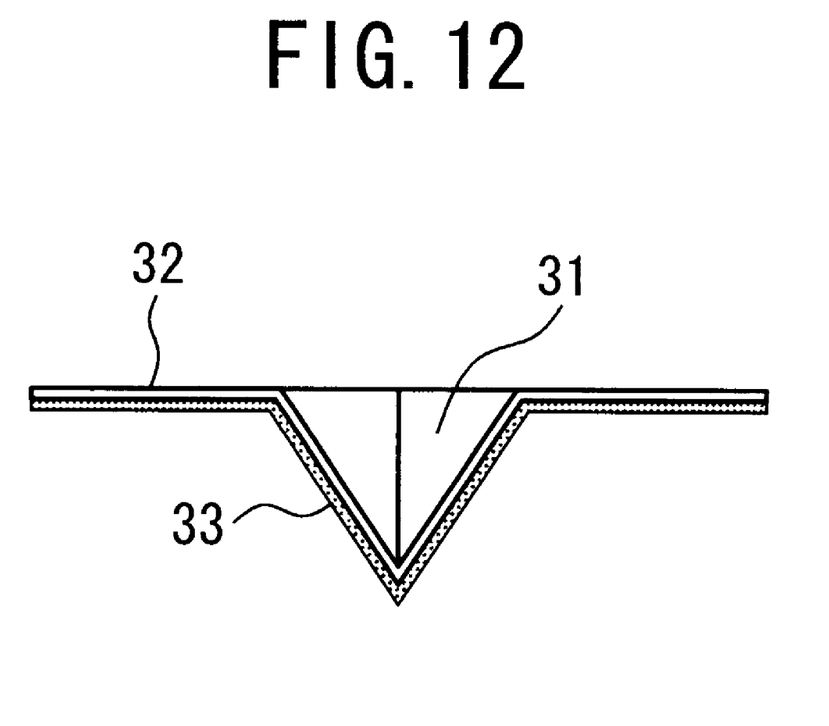
FIG. 12 is a front view showing a cantilever according to a fourth embodiment of the invention.

A fourth embodiment of the invention will now be described with reference to FIG. 12. In FIG. 12, numerals 31, 32 denote a probe portion and a lever portion, respectively, of silicon nitride film. Numeral 33 denotes for example an electrically conductive coating film formed on the surface of the probe portion 31 and the lever portion 32. It is for example Pt (platinum) film and is formed by means of sputtering, vacuum evaporation, etc. By thus using the electrically conductive coating film 33 to coat the probe portion 31 and the lever portion 32 of the cantilever consisting of silicon nitride film which is an insulating material, it becomes possible to add conductivity to the cantilever.

Here, the material of the cantilever is not limited to a silicon nitride film and it is also possible to use a silicon carbide film or the like. Further, the coating film may also be formed of such material as one having a high hardness instead of an electrically conductive coating film when a wear resistance is to be provided of the probe portion. For example, if DLC is used as the coating film, it is possible to construct a cantilever to which conductivity can be added and in which wear of the probe portion is less likely to occur.

The construction of the fourth embodiment can be adjusted to be applicable to the cantilever described in the above described first, second, or third embodiment. Further, while the cantilever having a coating film in the fourth embodiment has been described as that limited to a two-layer structure including the coating film, it is naturally also possible to construct the cantilever as having three or more layers. In the case of vacuum evaporation of Au over the silicon nitride film, for example, Cr or the like can be used as an intermediate layer. Furthermore, by coating a magnetic film, the cantilever can be used as that of Magnetic Force Microscopy (MFM). In this case, the magnetic film is formed for example by means of sputtering or vacuum evaporation of nickel.

As has been described by way of the above embodiments, it is possible according to the first aspect of the invention to achieve a cantilever for Scanning Probe Microscopy in which the probe portion is obtained as light in weight and high in rigidity so that the positioning alignment is easy and high-resolution measurement is steadily possible. It is possible according to the second aspect of the invention to obtain a cantilever having the probe portion which is light in weight and high in rigidity and at the same time has a relatively high aspect ratio. It is possible according to the third aspect of the invention to achieve a cantilever having the probe portion which can be more easily positioned in alignment. It is possible according to the fourth to sixth aspects of the invention to achieve a cantilever having the probe portion of a simple construction where weight is reduced while securing the rigidity. It is possible according to the seventh aspect of the invention to provide a cantilever which can be made through a relatively easy fabricating process. It is possible according to the eighth aspect of the invention to provide the cantilever which has an electricall conductive lever portion and probe portion. It is possible according to the ninth aspect of the invention to provide a cantilever of which the scope of design can be readily made wider concerning the rigidity of the probe portion, spring constant of the lever portion, etc. It is possible according to the tenth aspect of the invention to provide a cantilever of which the characteristics of the probe portion and lever portion can be readily changed.

What is claimed is:

1. A cantilever for Scanning Probe Microscopy, comprising:

a support portion;

a lever portion extended from the support portion; and a probe portion provided at a free end of the lever portion, said probe portion being configured by two thin plates crossing each other in a manner facing each other, each plate having one side respectively being one of the different sides of a V-like notch formed on the free end of said lever portion.

2. The cantilever for Scanning Probe Microscopy according to claim 1, wherein the two thin plates of said probe portion are respectively warped and curved toward the sides at which said plates face each other.

3. The cantilever for Scanning Probe Microscopy according to claim 1, wherein an apex of said probe portion is disposed at a position perpendicularly below the free end of said lever portion or at a position beyond the free end of said lever portion.

4. The cantilever for Scanning Probe Microscopy according to claim 2, wherein an apex of said probe portion is disposed at a position perpendicularly below the free end of said lever portion or at a position beyond the free end of said lever portion.

5. The cantilever for Scanning Probe Microscopy according to claim 1, wherein the two thin plates constituting said probe portion are each triangular.

6. The cantilever for Scanning Probe Microscopy according to claim 2, wherein the two thin plates constituting said probe portion are each triangular.

7. The cantilever for Scanning Probe Microscopy according to claim 3, wherein the two thin plates constituting said probe portion are each triangular.

8. The cantilever for Scanning Probe Microscopy according to claim 4, wherein the two thin plates constituting said probe portion are each triangular.

9. The cantilever for Scanning Probe Microscopy according to claim 1, wherein the two thin plates constituting said probe portion are each quadrangular.

10. The cantilever for Scanning Probe Microscopy according to claim 2, wherein the two thin plates constituting said probe portion are each quadrangular.

11. The cantilever for Scanning Probe Microscopy according to claim 3, wherein the two thin plates constituting said probe portion are each quadrangular.

12. The cantilever for Scanning Probe Microscopy according to claim 4, wherein the two thin plates constituting said probe portion are each quadrangular.

13. The cantilever for Scanning Probe Microscopy according to claim 1, wherein the two thin plates constituting said probe portion are each sector-shaped.

14. The cantilever for Scanning Probe Microscopy according to claim 2, wherein the two thin plates constituting said probe portion are each sector-shaped.

15. The cantilever for Scanning Probe Microscopy according to claim 3, wherein the two thin plates constituting said probe portion are each sector-shaped.

16. The cantilever for Scanning Probe Microscopy according to claim 4, wherein the two thin plates constituting said probe portion are each sector-shaped.

17. The cantilever for Scanning Probe Microscopy according to any one of claims 1 to 16, wherein said probe portion and said lever portion are monolithically formed from the same material.

18. The cantilever for Scanning Probe Microscopy according to claim 17, wherein the material for monolithically forming said probe portion and lever portion is a conductive film.

19. The cantilever for Scanning Probe Microscopy according to any one of claims 1 to 16, wherein said probe portion and said lever portion are formed of different materials from each other.

20. The cantilever for Scanning Probe Microscopy according to any one of claims 1 to 16, wherein a film of a material different from the constituting material of said probe portion and said lever portion is formed on a surface of said probe portion and said lever portion.

21. The cantilever for Scanning Probe Microscopy according to claim 17, wherein a film of a material different from the constituting material of said probe portion and said lever portion is formed on a surface of said probe portion and said lever portion.

22. The cantilever for Scanning Probe Microscopy according to claim 18, wherein a film of a material different from the constituting material of said probe portion and said lever portion is formed on a surface of said probe portion and said lever portion.

23. The cantilever for Scanning Probe Microscopy according to claim 19, wherein a film of a material different from the constituting material of said probe portion and said lever portion is formed on a surface of said probe portion and said lever portion.

* * * * *